United States Patent [19]
Natsume et al.

[11] Patent Number: 6,014,528
[45] Date of Patent: Jan. 11, 2000

[54] IMAGE FORMING APPARATUS HAVING SIMULTANEOUS READING AND PRINTING OPERATIONS AND JOB RECOVERY THEREFOR

[75] Inventors: Junko Natsume, Aichi-Ken; Kazuo Inui, Toyohashi; Hiroshi Yamada, Toyokawa, all of Japan

[73] Assignee: Minolta Co., Ltd., Osaka, Japan

[21] Appl. No.: 08/948,524

[22] Filed: Oct. 9, 1997

[30] Foreign Application Priority Data

Nov. 8, 1996 [JP] Japan ................................. 8-296347

[51] Int. Cl.[7] .................................................. G03G 15/00
[52] U.S. Cl. ................................ 399/19; 399/82; 358/300
[58] Field of Search ................................ 399/17, 19, 82, 399/83, 85, 21; 358/300

[56] References Cited

U.S. PATENT DOCUMENTS

| | | | |
|---|---|---|---|
| 5,055,935 | 10/1991 | Ohno | 358/296 |
| 5,148,286 | 9/1992 | Knodt et al. | 358/296 |
| 5,491,557 | 2/1996 | Nakajima et al. | 358/296 |
| 5,689,765 | 11/1997 | Nishinozono | 399/81 |
| 5,761,567 | 6/1998 | Yoshizuka | 399/17 |
| 5,809,371 | 9/1998 | Inui et al. | 399/81 |

FOREIGN PATENT DOCUMENTS

| | | |
|---|---|---|
| 60-218668 | 11/1985 | Japan . |
| 5-014644 | 1/1993 | Japan . |
| 05075772 | 3/1993 | Japan . |
| 05336385 | 12/1993 | Japan . |
| 8-274935 | 10/1996 | Japan . |

*Primary Examiner*—Robert Beatty
*Attorney, Agent, or Firm*—McDermott, Will & Emery

[57] ABSTRACT

An image forming apparatus capable of simultaneously performing an image forming operation of a first job and an image reading operation of a second job wherein the jobs comprise a plurality of sheets. The apparatus has a controller which continues the image reading operation of the second job even when the image forming operation of the first job is stopped, and prohibits the start of an image reading operation of a third job different from said first and second job when the image reading operation of said second job ends.

4 Claims, 11 Drawing Sheets

IMAGE FORMING APPARATUS HAVING SIMULTANEOUS READING AND PRINTING OPERATIONS AND JOB RECOVERY THEREFOR

BACKGROUND OF THE INVENTION

1. Field of the Invention

The present invention relates to an image forming apparatus, and specifically relates to an image forming apparatus with a multi-job function.

2. Description of the Related Art

In the field of conventional image forming apparatuses with multi-job function, the aspect of job control is emphasized as, for example, in the image forming apparatus disclosed in Japanese Laid-Open Patent Application No. 5-75772. The image forming apparatus disclosed in the aforesaid publication is capable of reading a separate job and reserving image formation during the execution of the printing operation of a previous job.

On the other hand, there is also a conventional apparatus which stops an image reading operation immediately when a print operation is stopped.

The image forming apparatus disclosed in Japanese Laid-Open Patent Application No. 5-75772 provides that successive separate jobs are reserved and their images read even after printing has stopped. Therefore, image data stored in memory are not erased by printing the image, such that image data gradually accumulate in said memory. This accumulation of image data causes memory overflow. When memory overflow occurs, image data are lost during the reading process. This situation is disadvantageous insofar as the document must be reset and the image of the document must be reread.

Furthermore, in image forming apparatuses capable of independently executing reading operations and printing operations, there is no need to stop a reading operation at the same time a print operation stops as in the case of the aforesaid conventional apparatus. That is, stopping of the image reading process is an unnecessary control from the perspective of operating efficiency insofar as memory overflow does not occur.

OBJECTS AND SUMMARY

An object of the present invention is to eliminate the previously described disadvantages.

Another object of the present invention is to provide an image forming apparatus capable of smoothly performing the document reading operation.

Still another object of the present invention is to provide an image forming apparatus that prevents the overflow of excess image data in an image memory when printing is stopped.

Yet another object of the present invention is to provide an image forming apparatus capable of smoothly performing a document reading operation and preventing overflow of excess image data in an image memory when printing is stopped.

These and other objects are attained by providing an image forming apparatus capable of simultaneously performing an image forming operation of a first document and an image reading operation of a second document different from the first document, the image forming apparatus having a control means to continue the image reading operation of the second document even when the image forming operation of the first document is stopped, and prohibiting the start of an image reading operation of a third document different from the first and second documents when the image reading operation of the second document ends.

These objects of the present invention are further attained by providing an image forming apparatus capable of accepting a plurality of jobs, the image forming apparatus having a control means to continue the image reading operation of a second job when the printing operation of a first job is stopped, and prohibiting an image reading operation of a third job after the image reading operation of the second job ends.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

A copying apparatus provided with a multi-job function related to the present invention is described hereinafter with reference to the accompanying drawings. A first embodiment of the present invention is described below.

Figure 1:
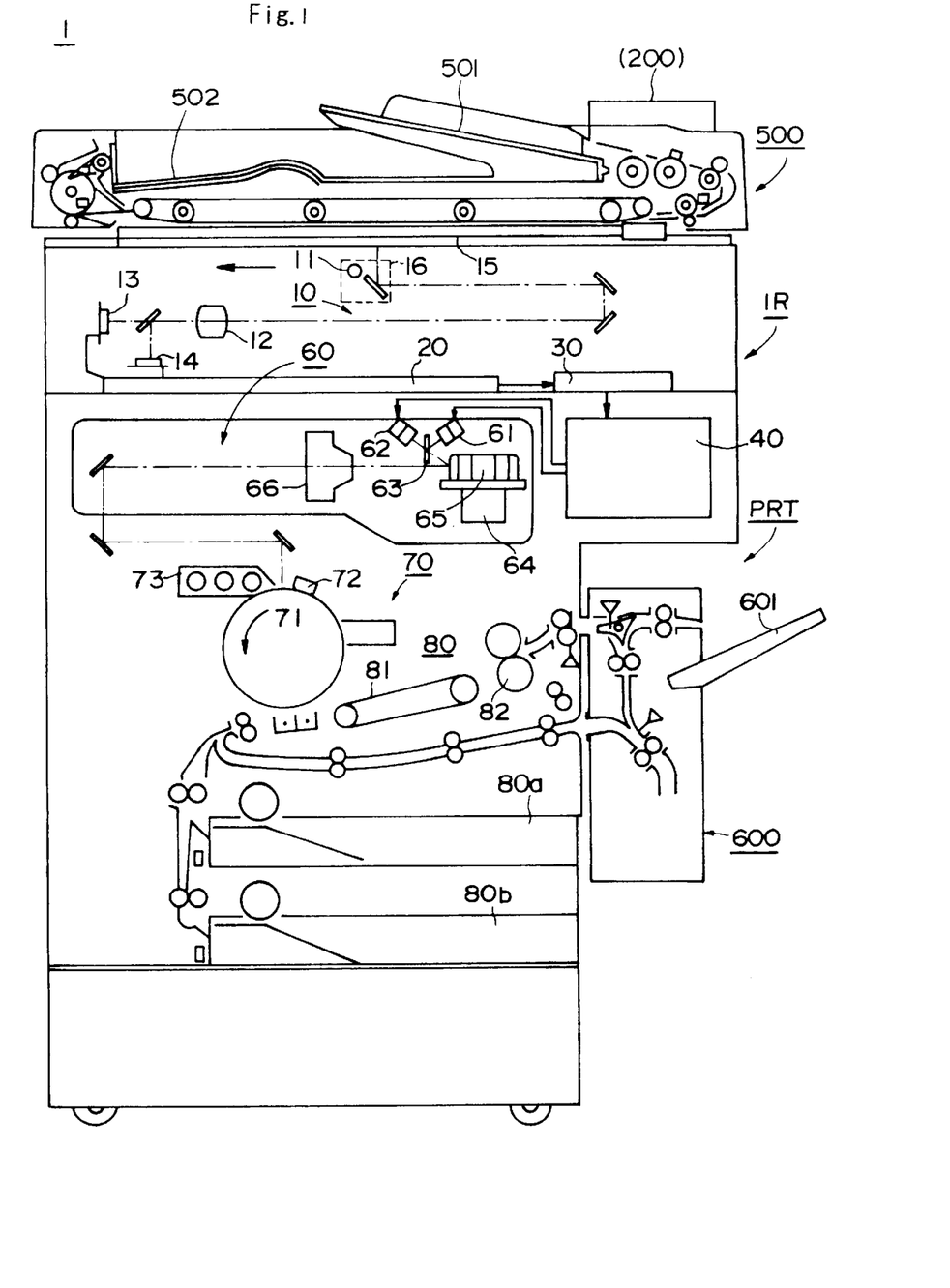
FIG. 1 is a section view briefly showing the construction of a copying apparatus of the present invention.

FIG. 1 is a cross section view briefly showing the construction of copying apparatus 1.

Copying apparatus 1 broadly comprises an image reader IR to read the image of a document and generate image data therefrom, image memory 30 to temporarily store image data obtained by said image reader IR, printer PRT to print on a copy sheet based on image data stored in said image memory 30, operation panel 200 to input operations (located in a perpendicular direction relative to the paper surface on the top of copy apparatus 1), document feeder 500 to transport documents and invert a document front-to-back as necessary, and sheet recirculation unit 600 to refeed to printer PRT a copy sheet inverted front-to-back after being copied once as necessary. The operation of the aforesaid components is controlled by a control unit not shown in the illustrations. The control unit comprises a read only memory (ROM) to store programs to operate copy apparatus 1, a central processing unit (CPU) to execute said programs, and random access memory (RAM) to store information required to execute said programs.

In document feeder 500, documents stacked on document feed tray 501 are automatically set on document table 15, and automatically ejected to discharge tray 502 after image reader IR completes the reading of said document.

Image reader IR comprises a scanning unit 10, and an image signal processing unit 20. In scanning unit 10, the image of a document placed on document table 15 is optically exposed by an exposure lamp 11 mounted on a movable scanner 16 provided below document table 15. The light reflected from the exposed document is transmitted through condensing lens 12, and is converted to electric signals by photoelectric conversion elements 13 and 14 which comprise a charge-coupled device (CCD) array or the like.

Then, the electric signals obtained by scanning unit 10 are transmitted to image signal processing unit 20. In image signal processing unit 20, the image data converted to electric signals are binarized, and subsequently subjected to image processing such as image quality correction, variable magnification, image editing and the like.

Then, the image data generated by image reader IR are stored in image memory 30.

The printer PRT comprises a print processing unit 40, optical unit 60, image forming unit 70, and sheet transport unit 80. The print processing unit 40 drives the optical unit 60 based on the image data received from image memory 30. In the optical unit 60, semiconductor lasers 61 and 62 are controlled by the print processing unit 40 and generate laser beams which are respectively emitted therefrom. These laser beams are combined by a dichroic mirror 63, reflected by a polygonal mirror 65 which is rotated by a motor 64, and pass through a main lens 66 to the image forming unit 70.

In image forming unit 70, a photosensitive member 71 is uniformly charged by a charger 72, and subsequently irradiated by the aforesaid laser beam. An electrostatic latent image is formed on the surface of said photosensitive member 71 by means of the irradiation by the laser beam. Then, the latent image formed on the surface of photosensitive member 71 is developed as a toner image by a developing device 73. Sheet transport unit 80 transports a copy sheet to and from the image forming unit 70. The toner image formed on the surface of the photosensitive member 71 is transferred onto a copy sheet transported from paper cassette 80a or 80b. Thereafter, the copy sheet is transported to fixing device 82 by sheet transport belt 81, and after the toner is fused onto said sheet via heat and pressure, the copy sheet is ejected onto discharge tray 601 of recirculation unit 600.

In copying apparatus 1, errors caused by paper jams and the like can be detected in image reader IR and printer PRT during the aforesaid operations. Furthermore, other errors can be detected such as paper cutting errors in image reader IR, and improper placement of a document on document table 15 in printer PRT. When the operation of copying apparatus 1 is stopped due to a blockage or the like, this condition can also be detected.

Figure 2:
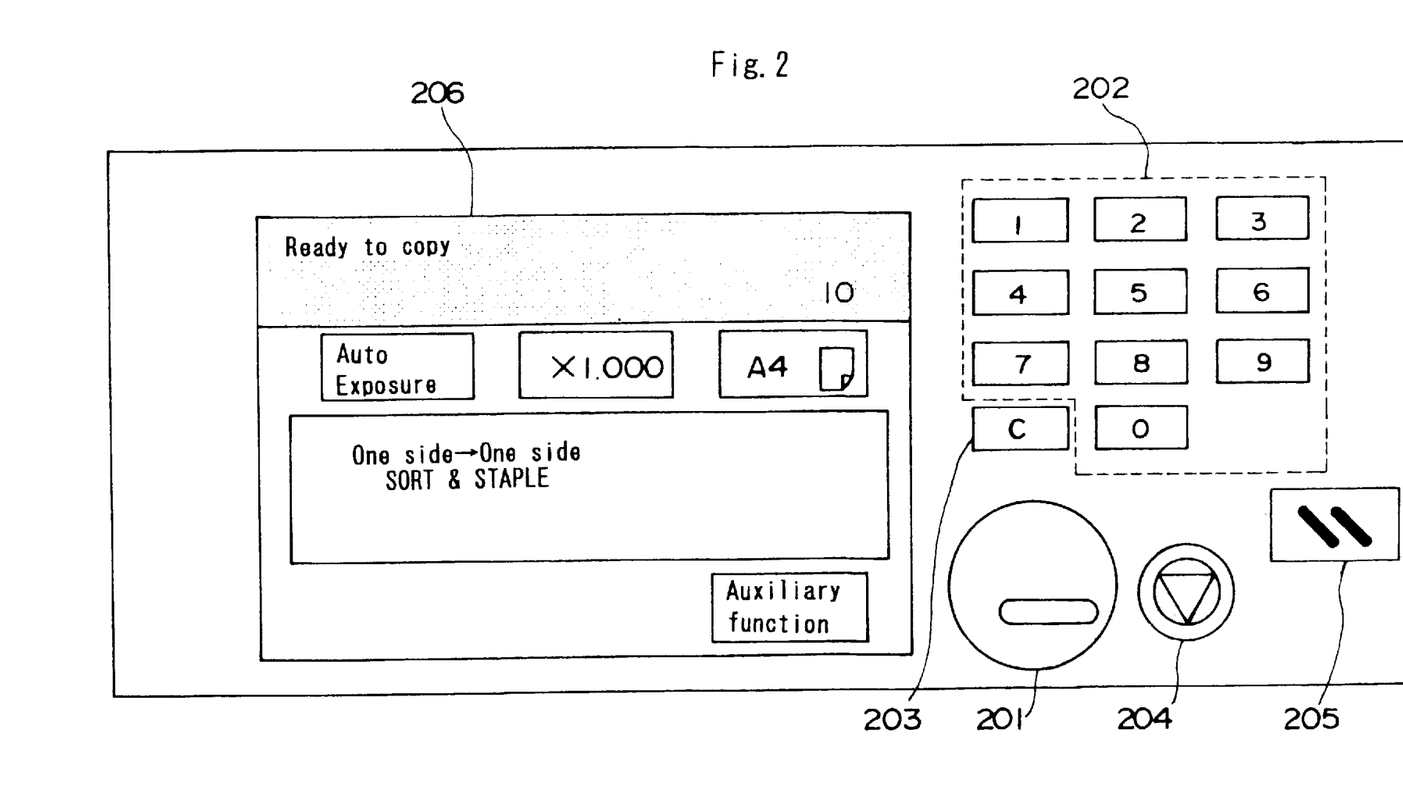
FIG. 2 is a plan view showing the construction of the operation panel of the copying apparatus.

FIG. 2 is a plan view showing the construction of operation panel 200 of copying apparatus 1. The start key 201 is used to start a copy operation; and the ten-key pad 202 is used to input numeric values such as the number of copies. The clear key 203 is used to clear input numeric values and delete image data from image memory 30; the stop key 204 is used to stop an operation; and panel reset key 205 is used to delete set operation modes and jobs. The liquid crystal display (LCD) 206 displays various types of operating modes, and a touch screen is mounted on the front surface thereof. Various types of settings can be set by the touch screen in accordance with the display content of LCD 206. These display contents are described later.

Figure 3:
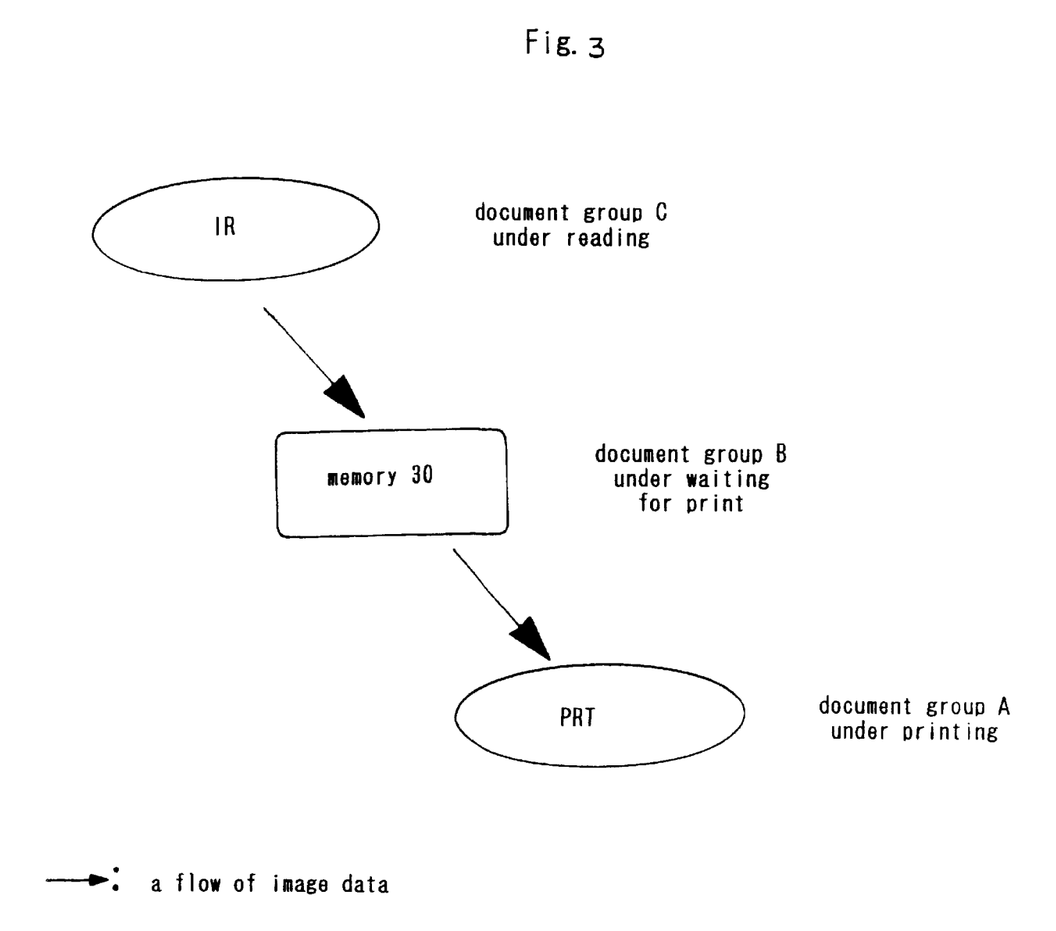
FIG. 3 illustrates the multi-job operation of the copying apparatus.

FIG. 3 illustrates the multi-job operation in copying apparatus 1. The processes executed in copying apparatus 1 before a copy is produced from a placed document can be broadly divided into three processes: a process of reading a document image and generating image data, a process of correcting and storing said image data, and a process of printing based on the stored image data. These three consecutive processes are executed in the aforesaid sequence for a particular document group to produce a copy of said document group. These three processes are executed by the image reader IR, image memory 30, and printer PRT, respectively. Hereinafter, these processes shall be referred to as jobs.

The multi-job function executed by copying apparatus 1 is the operation of reading a document image of a different new document group by image reader IR and storing the read image data in image memory 30 by a reservation setting on operation panel 300 while printer PRT is printing a copy image of another document group stored in image memory 30 as image data.

That is, the multi-job function executed by copying apparatus 1 provides that, while printer PRT is outputting copies of document group A, a document group B different from said document group A is stored in memory, and a document group C different from either document groups A and B is read by image reader IR. In other words, the printing and reading operations are executed independently via the multi-job function.

Therefore, when either the reading operation or the printing operation is stopped during simultaneous execution of said two operations, the other operation may continue without stopping because the printing operation and reading operation are executed independently.

Figure 4:
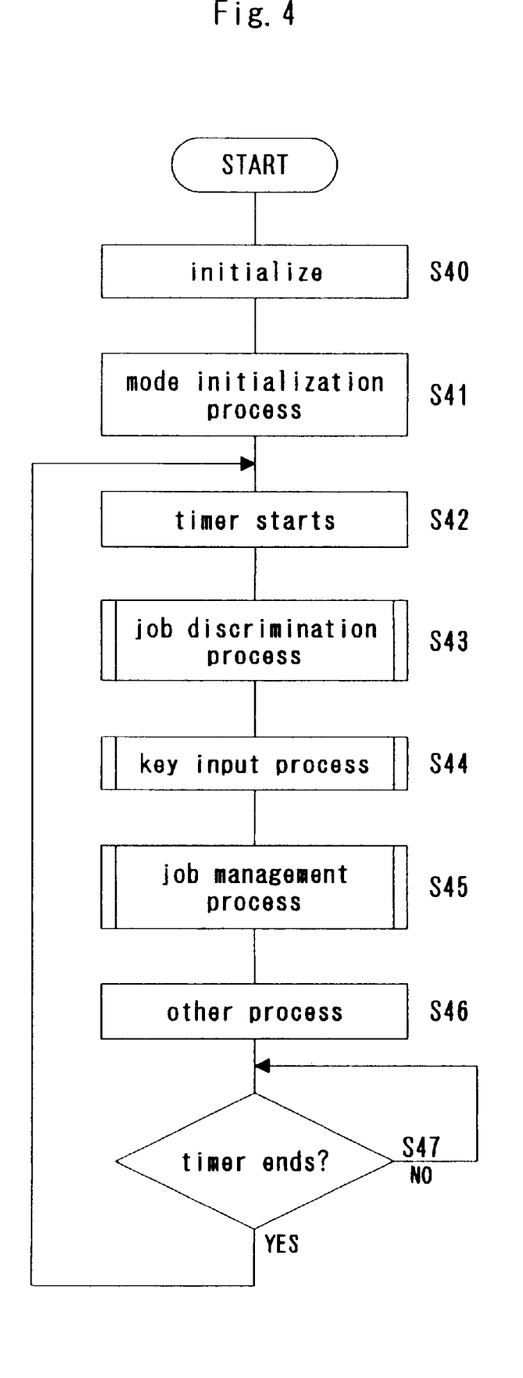
FIG. 4 is a flow chart of the main routine of the copying apparatus.

FIG. 4 is a flow chart of the main routine executed by the CPU which controls the operation of copying apparatus 1. The program starts when copying apparatus 1 is turned ON and the CPU is reset. In step 40 (hereinafter, step is abbreviated as "S"), the CPU is initialized to clear the RAM and set the various types of registers. Then, in S41, the mode initialization process is executed for copying apparatus 1.

In S42, the CPU internal timer is started. The timer value is set beforehand during initialization.

In S43, the job discrimination process is executed to determine the state of the current job; in S44, the key input process is executed to control key input via the hard keys and touch panel; in S45, the job management process is executed to manage the job. The processes of S43~S45 are executed in subroutines which are described later. When these processes end, general processing is executed in S46 to control other aspects of the copying apparatus.

When the processes of S42~S46 are executed, a check is made in S47 to determine whether or not the set time of the internal timer has elapsed. When the set time of the internal timer has elapsed (S47: YES), one routine ends, and the program returns to S42. When it is determined that the set time of the internal timer has not elapsed (S47: NO), the program returns to S47.

The value of the internal timer set in S42 is the time required to execute one routine. The counting performed by various types of timers used in the various subroutines described later use the aforesaid time of one routine of the main routine. The time required to execute one routine of the main routine is a value smaller than the values of the various timers set within the subroutines, and the end of the timers in the subroutines is determined by detecting how many times the main routine has been executed.

Figure 5:
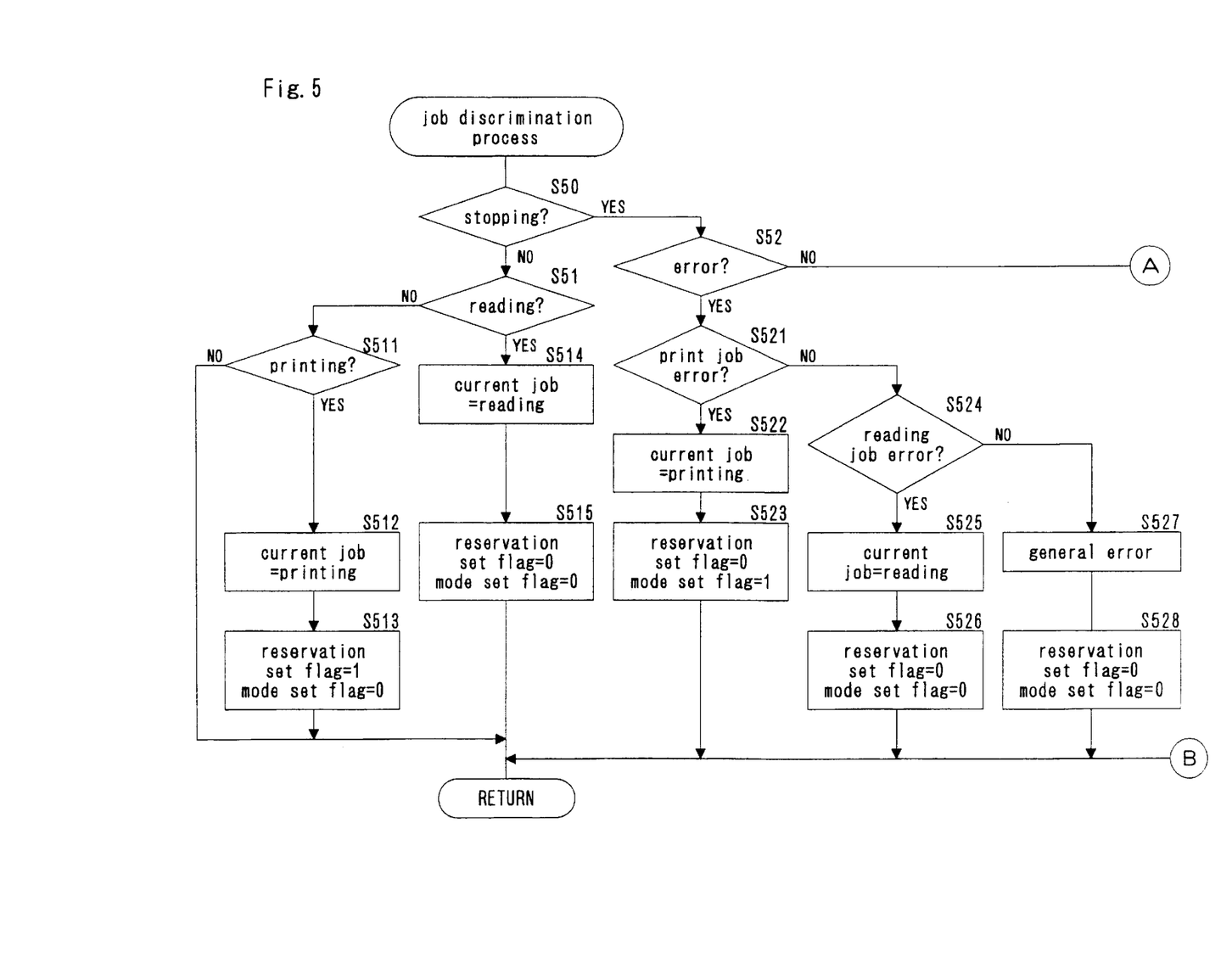
FIG. 5 is a first flow chart of the job discrimination process.
Figure 6:
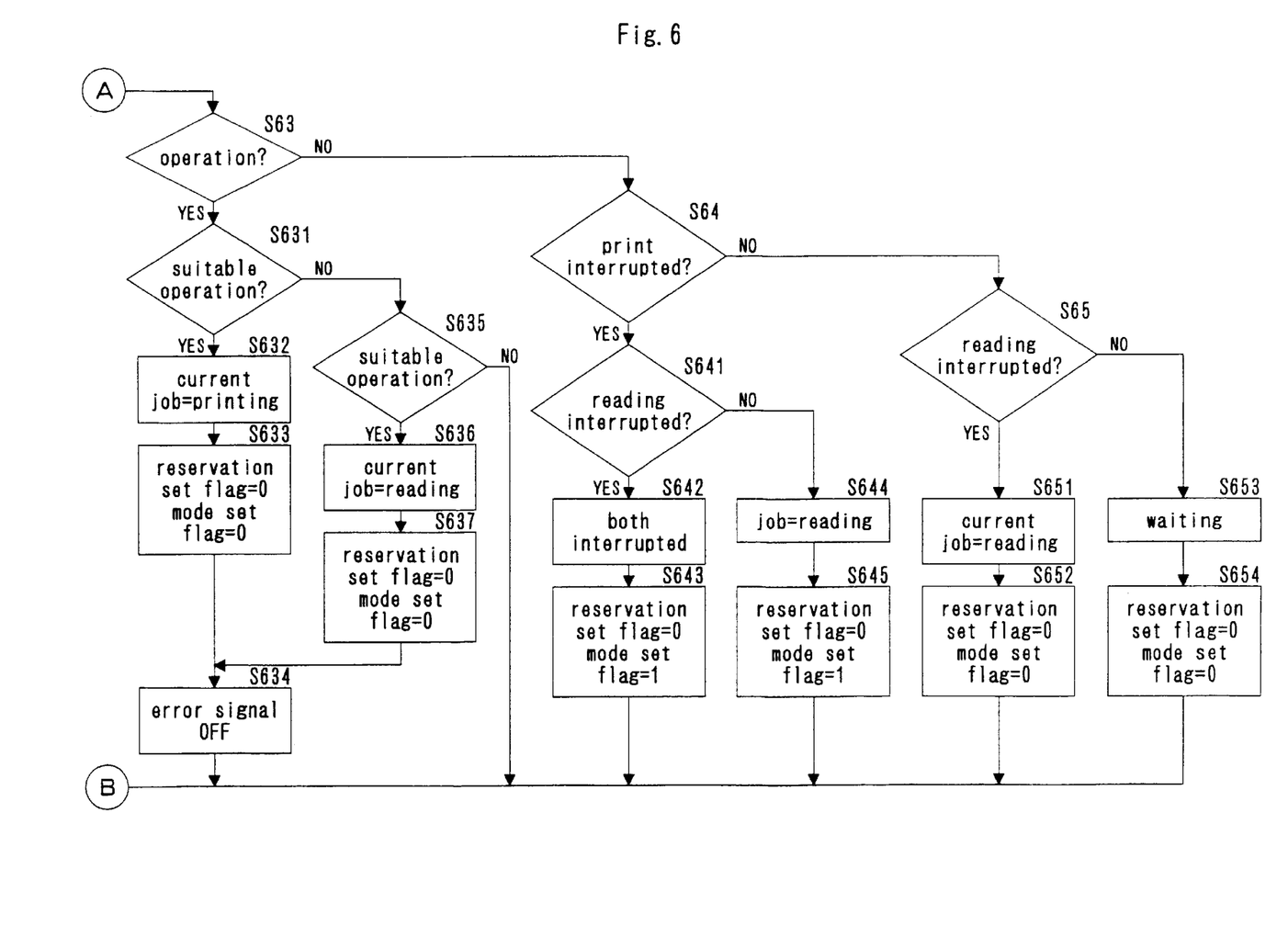
FIG. 6 is a second flow chart of the job discrimination process.

FIGS. 5 and 6 are flow charts showing the sequence of the job discrimination process subroutine of S43 shown in FIG. 4.

A current job is a job determined to be executed by user operation of copying apparatus 1 at a particular time among a plurality of jobs being executed by copying apparatus 1. In contrast, jobs other than a current job are referred to as sub-jobs. A job is defined as either a reading operation or a printing operation.

A reservation set flag and mode set flag express either [0] or [1] to determine whether or not the reservation setting and copy mode setting are enabled (the reservation set flag and copy mode set flag are abbreviated as "reservation set" and "mode set" in the drawings). If either the reservation set flag or mode set flag is [0], setting is not enabled, whereas when either flag is [1], setting is enabled. The reservation set flag is used in the key input process described later (the mode set flag is used together with the reservation set flag in the key input process of a second embodiment of the invention).

In S50, a check is made to determine whether or not the copying apparatus 1 is stopped. If the copying apparatus 1 is not stopped (S50: NO), a check is made in S51 to determine whether or not a reading operation is currently on-going. If a reading operation is currently on-going (S51: YES), the current job is set at "reading" in S514. Then, in S515, the reservation set flag is set at [0] and the mode set flag is set at [1], after which this routine ends.

If copying apparatus 1 is not currently executing a reading operation (S51: NO), a check is made in S511 to determine whether or not a print operation is currently executing. If a print operation is currently executing (S511: YES), the current job is set at "print" in S512. In S513, the reservation set flag is set at [1] and the mode set flag is set at [0], after which this routine ends. In any other state, the reservation set flag is set at [0]. Therefore, when a print operation is stopped, reading of a new document is prohibited. If a print operation is not currently executing (S511: NO), the current job is maintained in the state prior to the calling of this routine, and this routine ends.

If copying apparatus 1 is stopped in S50 (S50: YES), a check is made in S52 to determine if the timing corresponds to an error such as a paper jam as previously mentioned. In brief, a signal is turned ON the moment an error occurs in copying apparatus 1, and the signal is turned OFF the moment the error is cleared. If the timing corresponds to the occurrence of an error (S52: YES), the type of error is determined in subsequent steps of S521, S524.

In S521, a check is made to determine whether or not an error is a print job error. If an error is a print job error (S521: YES), the current job is set at "print" in S522. In S523, the reservation set flag is set at [0] and the mode set flag is set at [1], after which this routine ends. If the error is not a print job error (S521: NO), a check is made in S524 to determine whether or not the error is a reading job error. If the error is a reading job error (S524: YES), the current job is set at "reading" in S525. In S526, the reservation set flag is set at [0] and the mode set flag is set at [1], after which this routine ends. If the error is neither a reading job error nor a print job error (S524: NO), it is determined in S527 that the error occurred in neither job, and the error is a general error of copying apparatus 1 caused by a blockage or the like. In S528, the reservation set flag is set at [0] and the mode set flag is set at [0], after which this routine ends.

If the timing does not indicate an error (S52: NO), a check is made in S63 to determine whether or not the error occurred due to user operation of copying apparatus 1, e.g., opening the cover, processing to release and error state and the like).

If a user operate copying apparatus 1 (S63: YES), a check is made in S631 to determine whether or not the action was suitable for a print job error. If the action was suitable for a print job error (S631: YES), the current job is set at "print" in S632. In S633, the reservation set flag is set at [0] and the mode set flag is set at [1], after which a signal is turned ON to indicate the aforesaid error in S634, and this routine ends. If the action was not suitable for a print job error (S631: NO), a check is made in S635 to determine whether or not the action was suitable for a reading job error. If the action was suitable for a reading job error (S635: YES), the current job is set at "reading" in S636. In S637, the reservation set flag is set at [0] and the mode set flag is set at [0], after which a signal is turned ON to indicate the aforesaid error in S634 in the same manner as the process for a print job error, and this routine ends. If the action was not suitable for a reading job error (S635: NO), this routine ends directly.

If a user did not operate the copying apparatus 1 (S63: NO), a check is made in S64, S641, S65 to determine what kind of state a job under interruption is.

In S64, a check is made to determined whether or not a print job has been interrupted. If a print job has been interrupted (S64: YES), a check is made in S641 to determine whether or not a reading job has been interrupted. If a reading job has been interrupted (while a print job is interrupted) (S641: YES), a check is made in S642 to determine whether or not both jobs in the interrupt state. In S643, the reservation set flag is set at [0] and the mode set flag is set at [1], after which this routine ends. If a reading job has not been interrupted (S641: NO), the current job is set at 'reading' in S644. In S645, the reservation set flag is set at [0] and the mode set flag is set at [1], after which this routine ends.

If a print job has not been interrupted (S64: NO), a check is made in S65 to determine whether or not a reading job has been interrupted. If a reading job has been interrupted (S65: YES), the current job is set at "reading" in S651. In S652, the reservation set flag is set at [0] and the mode set flag is set at [0], after which this routine ends. If a reading job has not been interrupted (S65: NO), a check is made in S63 to determine whether or not both jobs are on standby. In S654, the reservation set flag is set at [0] and the mode set flag is set at [0], after which this routine ends. The current job state is determined in the aforesaid sequence.

Figure 7:
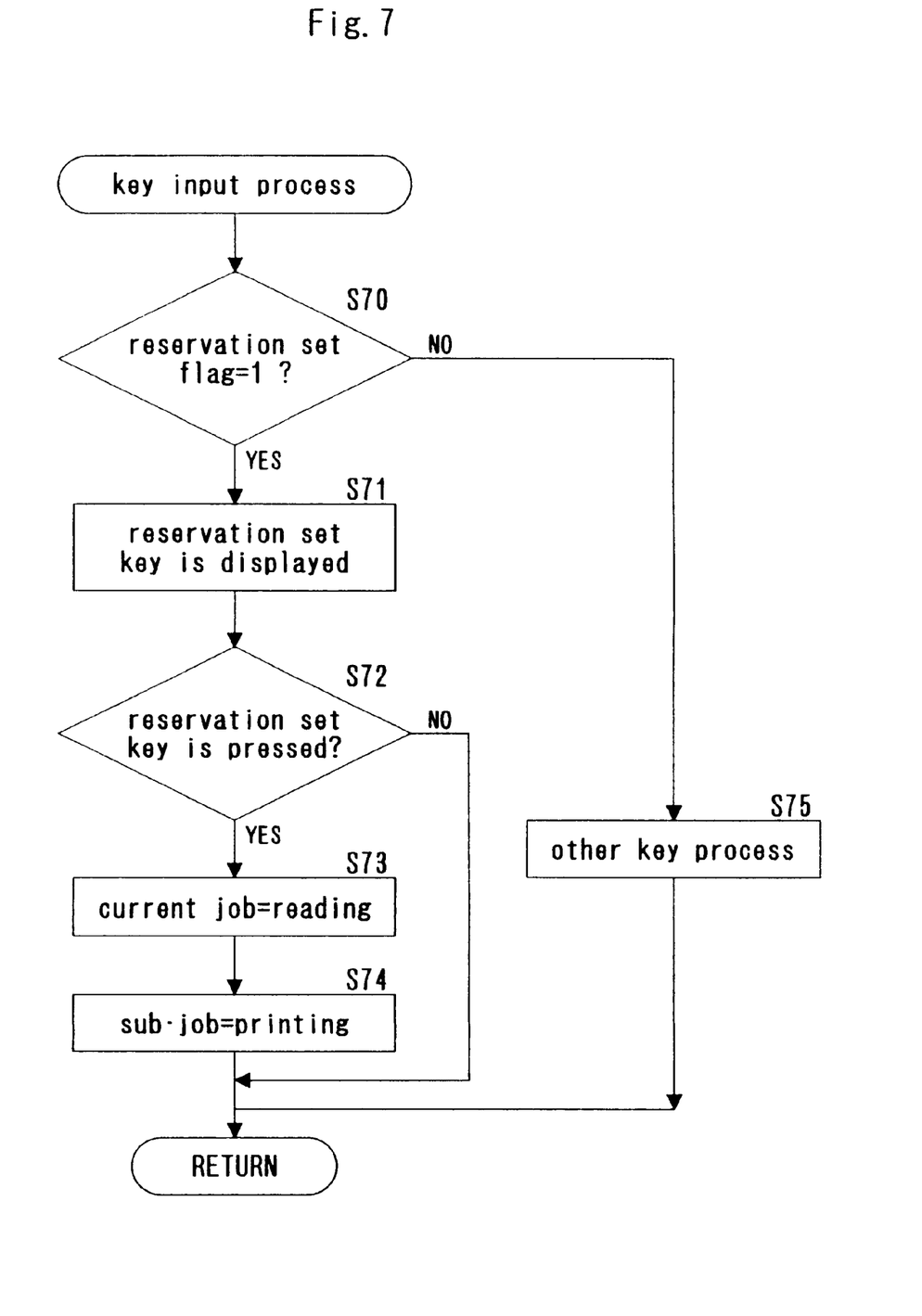
FIG. 7 is a flow chart of the key input process.

FIG. 7 is a flow chart showing the sequence of the key input process subroutine of S44 shown in FIG. 4.

In S70, a check is made to determine whether or not the reservation set flag is set at [1]. If the reservation set flag is set at [1] (S70: YES), the reservation set key is displayed in S71. In S72, a check is made to determine whether or not the reservation set key has been pressed. When the reservation set key has been depressed (S72: YES), the current job is set at "reading" in S73. In S74, the sub-job is set at "print" and this routine ends.

If the reservation set key has not been pressed (S72: NO), S73 and S74 are skipped, and this routine ends directly.

If the reservation set flag is not set at [1] (S70: NO), input processing is executed for the print key 201, ten-key pad 202, clear key 203, stop key 204, panel reset key 205, and touch panel screen of LCD 206 in S75. Accordingly, a new job cannot be reserved in copying apparatus 1 while a print operation is stopped.

Figure 8:
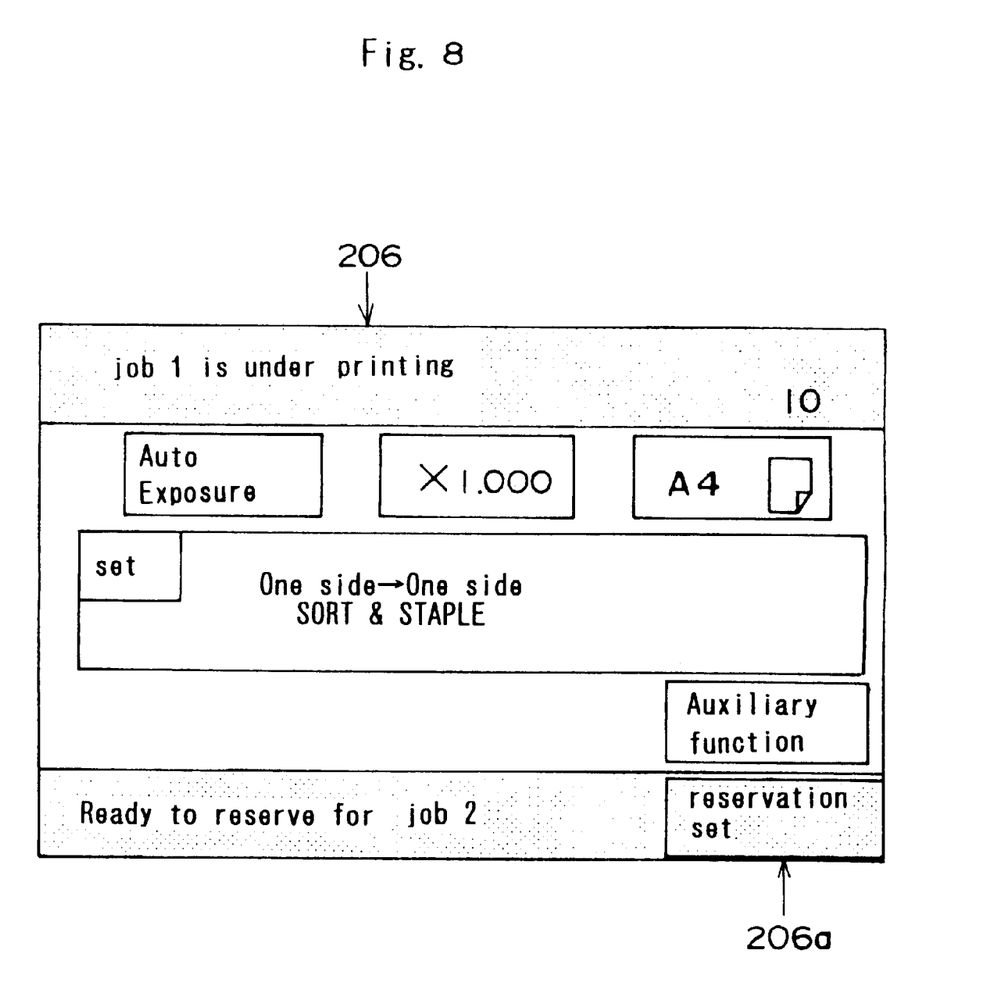
FIG. 8 is an illustration of a screen showing the reservation set key.

FIG. 8 illustrates the reservation set key 206a described by the sequence of FIG. 7. During printing, this key is displayed at the bottom right corner of LCD 206 on operation panel 200, as shown in FIG. 2.

Figure 9:
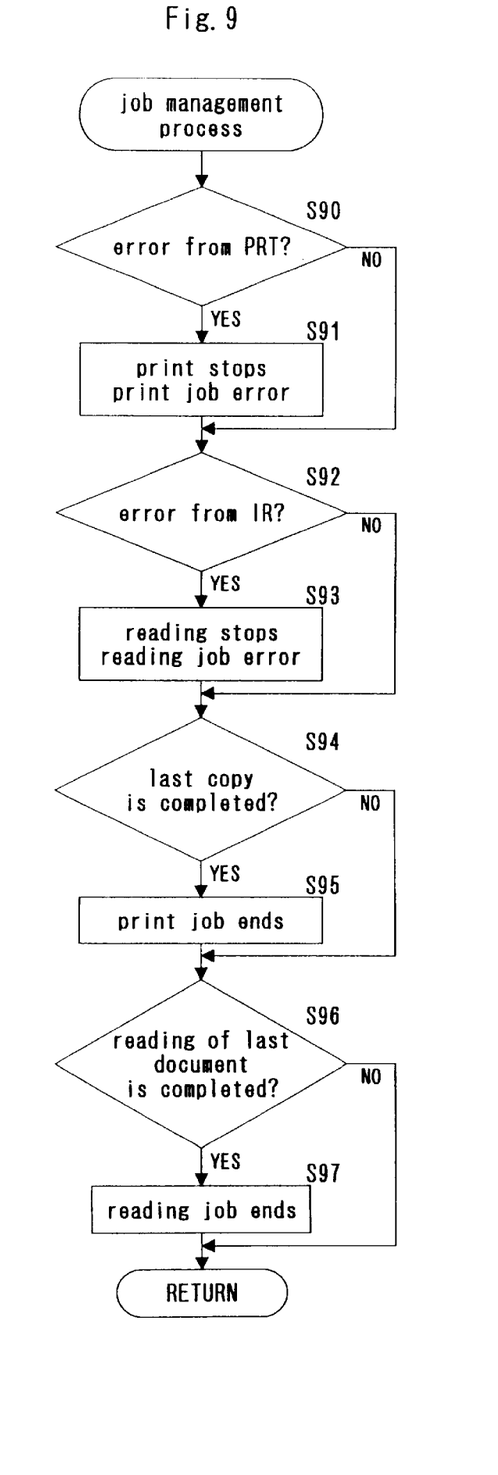
FIG. 9 is a flowchart of the job management process.

FIG. 9 is a flow chart showing the sequence of the job management process of S45 shown in FIG. 4.

In S90, a check is made to determine whether or not an error alert has been transmitted from printer PRT. If an error alert has been transmitted (S90: YES), printing is stopped and a print job error is designated in S91. If an error alert is not issued (S90: NO), step S91 is skipped. In S92, a check is made to determine whether or not an error alert has been transmitted from image reader IR. If an error alert has been transmitted from image reader IR (S92: YES), the reading operation is stopped and a reading job error is designated in S93. If an error alert is not issued (S92: NO), step S93 is skipped. Accordingly, if an error alert is not issued from image reader IR when a print operation is stopped due to error or the like, the reading operation continues via the aforesaid processes without issuing a stop command to the reading operation.

In S94, a check is made to determine whether or not printing of the last copy has been completed. If printing is completed (S94: YES), the print job ends in S95. If printing is not completed (S94: NO), step S95 is skipped. In S96, a check is made to determine whether or not reading of a last document has been completed. If reading is completed (S96: YES), the reading job ends in S97. If the reading job is not completed (S96: NO), step S97 is skipped. The routine ends and returns after the aforesaid processes.

According to the description above, if a document is being read when printing is stopped, the reading of said document continues until the reading of the job including said document is completed, and a reading operation of a new job is prohibited at the moment said reading operation ends. Therefore, it is possible to prevent the overflow of excess image data in the image memory while a print job is stopped, so as to smoothly execute the reading operation of a document.

Although in the present embodiment it has been presumed that a job (document group) comprises documents of a plurality of pages, it is to be understood that each job may comprise a document having a single page.

In the description above, the reservation of reading a document of a new job is such as to control the display of reservation set key 206a only during a printing operation, it is to be noted, however, that reservation set key 206a may be normally displayed and controlled so as to not accept input therefrom only when a printing operation is not executing.

Figure 10:
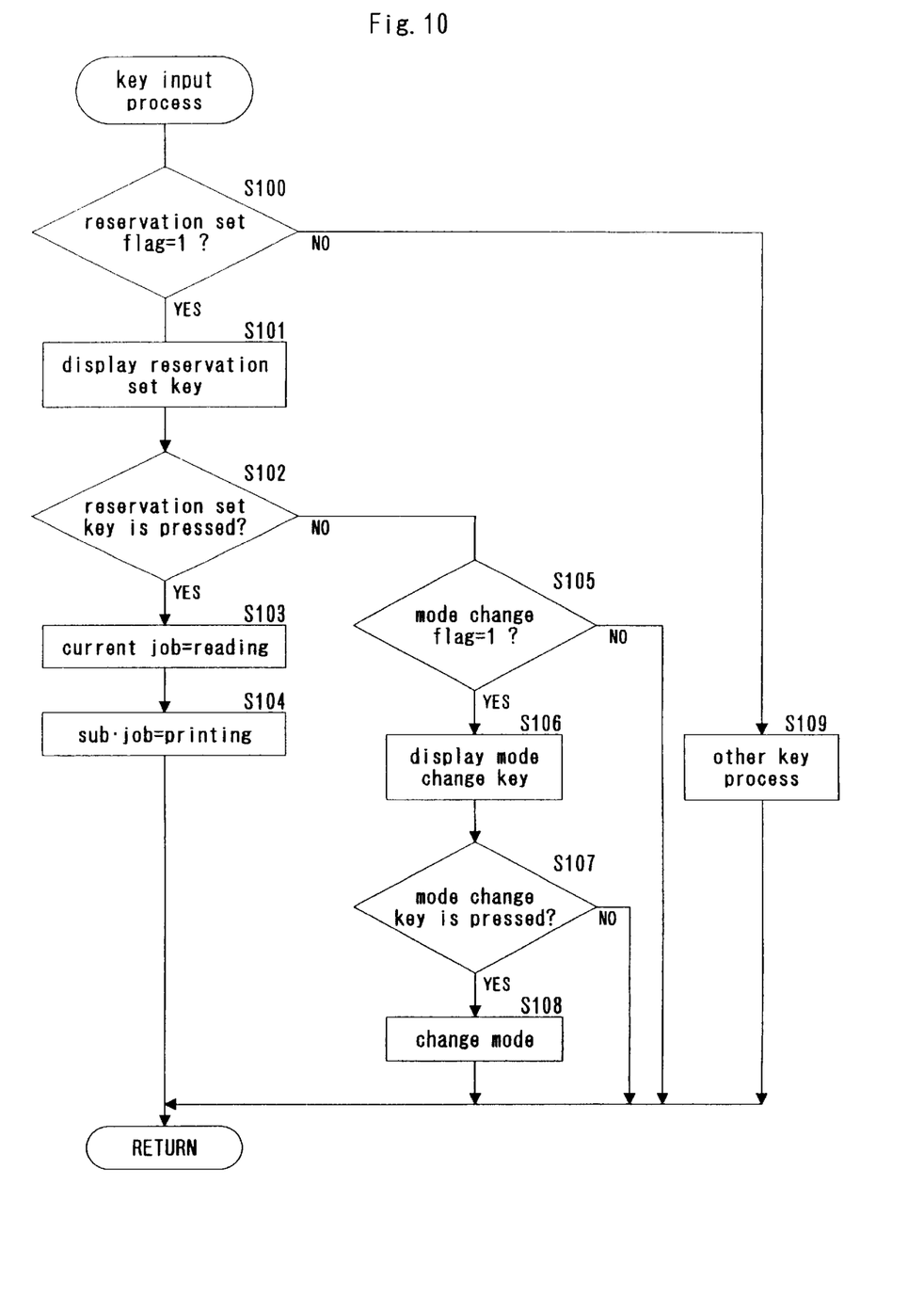
FIG. 10 is a flow chart of the key input process.

A second embodiment of the present invention is described below. In the second embodiment, the key input process shown in FIG. 7 of the first embodiment is modified as shown in FIG. 10. These modifications enable mode changes only when printing is stopped.

FIG. 10 is a flow chart showing the sequence of the key input subroutine of S44 shown in FIG. 4.

In S100, a check is made to determine whether or not the reservation set flag is set at [1]. If the reservation set flag is set at [1] (S100: YES), the reservation set key is displayed in S101. In S102, a check is made to determine whether or not the reservation set key has been pressed. When the reservation set key has been pressed (S102: YES), the current job is designated "reading" in S103. In S104, the sub-job is designated "printing" and this routine ends and returns.

If the reservation set key has not been pressed (S102: NO), a check is made in S105 to determine whether or not the mode change flag is set at [1]. If the mode change flag is set at [1] (S105: YES), the mode change key is displayed and a reading reservation of a new document is assigned in S106. In S107, a check is made to determine whether or not the mode change key has been pressed. If the mode change key has been pressed (S107: YES), the mode is changed in S108 and this routine ends and returns.

If the mode change key has not been pressed (S107: NO), step S108 is skipped, and this routine ends and returns. If the mode change flag is not set at [1] (S105: NO), this routine ends directly and returns.

If the reservation set flag is not set at [1] (S100: NO), input processing is executed for the print key 201, ten-key pad 202, clear key 203, stop key 204, panel reset key 205, and touch panel screen of LCD 206 in S109. Accordingly, a new job cannot be reserved in copying apparatus 1 while a print operation is stopped.

Figure 11:
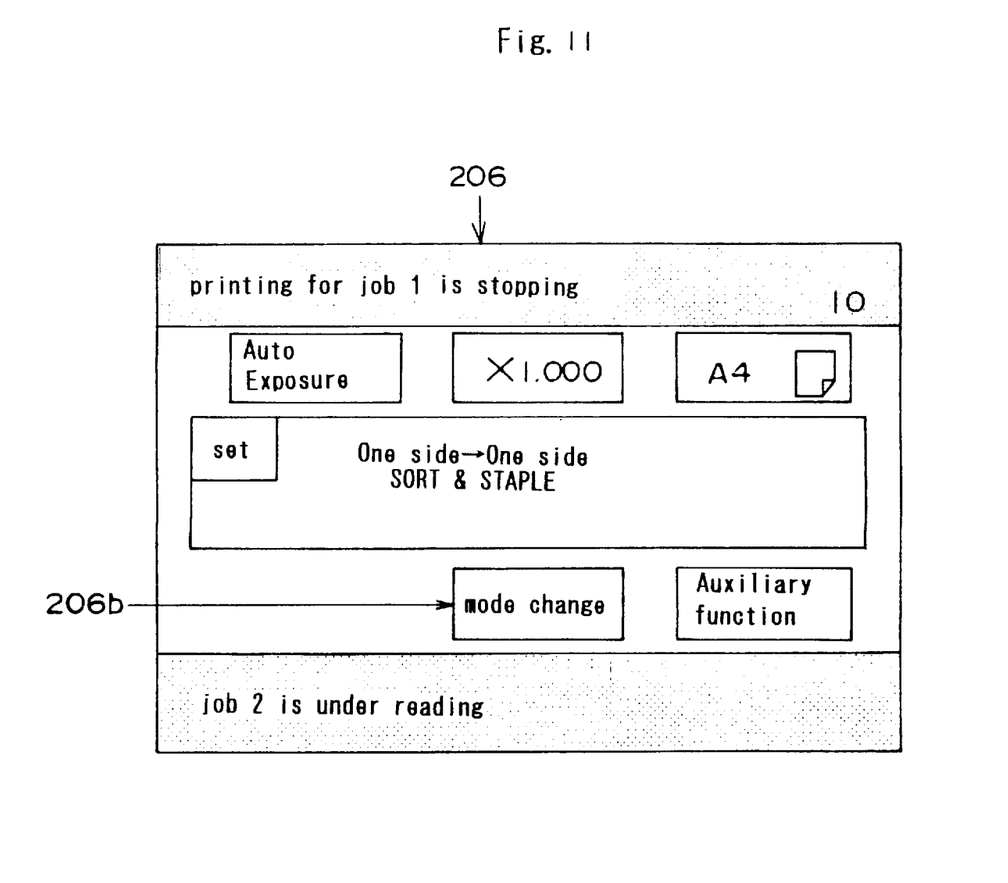
FIG. 11 is an illustration of a screen showing the mode change key.

FIG. 11 illustrates the mode change key 206b described by the sequence of FIG. 10. When printing is stopped, this key is displayed at the bottom center of LCD 206 on operation panel 200, as shown in FIG. 2.

According to the description above, when printing is stopped, it is possible to change the image forming parameters of a document waiting to be printed. Changeable image forming parameters are conditions which are changeable after the image reading process, for example, image forming density, paper size, stapling process and the like.

Therefore, it is possible to prevent the overflow of excess image data in the image memory while a print job is stopped, so as to smoothly execute the reading operation of a document.

In the description above, the changing of a copy mode is such as to control the display of reservation set key 206a only during a printing operation, it is to be noted, however, that the mode change key 106b may be normally displayed and controlled so as to not accept input therefrom only when a printing operation is not executing.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus comprising:
    a memory;
    an image reader capable of accepting a plurality of jobs and capable of reading images of the plurality of jobs one by one, wherein image data read by the reader is stored in the memory;
    a printer which prints images based on the image data outputted from the memory;
    wherein said reader and printer are capable of simultaneously performing an image reading operation and a printer operation respectively;
    continuing means for, when a printing operation of a first job is stopped and at least one image of a second job remains to be read, other than the image being read at the time of stopping of the first job, continuing an image reading operation of a second job until reading of all remaining images of the second job is finished; and prohibiting means for prohibiting an image reading operation of a third job, which is scheduled to be read after the second job, when the printing operation of the first job is stopped and reading of all remaining images of the second job is finished.

2. An image forming apparatus of claim 1, further comprising;

an operation panel; and permitting means for permitting a change of an image forming condition for the second job through the operation panel while the image forming operation of the first job is stopped.

3. An image forming apparatus capable of accepting a plurality of jobs, said image forming apparatus comprising:

image reading means for reading image information of documents;

memory means for storing the image information read by the reading means;

image forming means for forming an image on an image recording medium based on the image information stored in the memory means; and control means for, when a printing operation of a first job is stopped and at least one image of a second job remains to be read, other than the image being read at the time of stopping of the first job, continuing an image reading operation of the second job until reading of all remaining images of the second job is finished, and for prohibiting an image reading operation of a third job after the reading of all remaining images of said second job ends.

4. An image forming apparatus of claim 3, further comprising;

permitting means for permitting a change of an image forming condition for the second job while the image forming operation of the first job is stopped.

* * * * *